United States Patent
Murata et al.

(10) Patent No.: US 8,599,073 B2
(45) Date of Patent: Dec. 3, 2013

(54) MOBILE TERMINAL DEVICE

(75) Inventors: Wataru Murata, Kawasaki (JP); Shigeru Yamaguchi, Kawasaki (JP); Yoshiya Matsumoto, Kawasaki (JP); Satoshi Seino, Kawasaki (JP); Tsukasa Goro, Kawasaki (JP); Atsushi Sugi, Edogawa (JP)

(73) Assignee: Fujitsu Limited, Kawasaki (JP)

( * ) Notice: Subject to any disclaimer, the term of this patent is extended or adjusted under 35 U.S.C. 154(b) by 273 days.

(21) Appl. No.: 12/379,604

(22) Filed: Feb. 25, 2009

(65) Prior Publication Data
US 2009/0267845 A1 Oct. 29, 2009

(30) Foreign Application Priority Data
Apr. 28, 2008 (JP) .................. 2008-117854

(51) Int. Cl.
*H01Q 1/24* (2006.01)
*H01Q 3/02* (2006.01)
*H01Q 9/30* (2006.01)
*H01Q 1/10* (2006.01)

(52) U.S. Cl.
USPC ............ 343/702; 343/882; 343/900; 343/901

(58) Field of Classification Search
USPC ............... 343/702, 882, 900, 901; 455/575.7
See application file for complete search history.

(56) References Cited

U.S. PATENT DOCUMENTS

| | | | | |
|---|---|---|---|---|
| 3,918,671 A | * | 11/1975 | Mizusawa | 248/285.1 |
| 6,095,714 A | * | 8/2000 | Spencer | 403/377 |
| 6,250,960 B1 | * | 6/2001 | Youtsey | 439/578 |
| 7,468,701 B2 | | 12/2008 | Fujikawa et al. | |
| 2006/0038019 A1 | | 2/2006 | Kajiwara et al. | |
| 2007/0205960 A1 | * | 9/2007 | Fujikawa et al. | 343/906 |

FOREIGN PATENT DOCUMENTS

| | | |
|---|---|---|
| CN | 101030669 | 9/2007 |
| CN | 101030669 A | 9/2007 |
| JP | 02-188003 | 7/1990 |
| JP | 2001-126832 | 5/2001 |
| JP | 2006-060396 | 3/2006 |
| JP | 2008-054105 | 3/2008 |

OTHER PUBLICATIONS

Japanese Office Action for corresponding Japanese application 2008-117854; mailed Nov. 10, 2009.
Chinese Office Action issued Jun. 24, 2011 in corresponding Chinese Patent Application 200910126591.6.

\* cited by examiner

*Primary Examiner* — Jacob Y Choi
*Assistant Examiner* — Graham Smith
(74) *Attorney, Agent, or Firm* — Staas & Halsey LLP

(57) ABSTRACT

An antenna shaft of an antenna is first inserted through a shaft through-hole created on a lateral plate casing of a stationary-side front case. Then, a flange on the antenna shaft is screw-fixed in a screw hole created at a predetermined position on the lateral plate casing of the stationary-side front case. When the antenna shaft of the antenna is inserted through the shaft through-hole created on the lateral plate casing, an inserted tip of the antenna shaft abuts against a substantially V-shaped connection receiving unit, which is fixed on a circuit board in the stationary-side front case. As a result, an electric connection is established between the antenna and the circuit board.

4 Claims, 7 Drawing Sheets

MOBILE TERMINAL DEVICE

CROSS-REFERENCE TO RELATED APPLICATIONS

This application is based upon and claims the benefit of priority of the prior Japanese Patent Application No. 2008-117854, filed on Apr. 28, 2008, the entire contents of which are incorporated herein by reference.

BACKGROUND

1. Field

The present invention relates to a mobile terminal device having an antenna and particularly relates to a mobile terminal device that is waterproof and has an uncomplicated antenna attaching mechanism.

2. Description of the Related Art

Typically, in a cellular phone, a coupling unit is used to couple a movable-side housing having a display panel to a stationary-side housing having an operation panel in a foldable manner. Moreover, an external antenna is attached to the cellular phone for reception of radio waves. The antenna can be attached to the outside of the stationary-side housing in a foldable manner (e.g., see Japanese Patent Application Laid-open No. 2006-60396).

Given below is the description with reference to FIG. 7 of a conventional antenna attaching mechanism for attaching an external antenna to a cellular phone. FIG. 7 is a diagram for explaining a case when an external antenna is attached to a cellular phone in a conventional manner.

As shown in FIG. 7, an external antenna 300a is fixedly attached to a chassis 155 arranged inside a stationary-side housing (a stationary-side front case 110 and a stationary-side rear case 120) of a cellular phone 10. The chassis 155 is also used as a waterproofing member.

More particularly, as shown in FIG. 7, the chassis 155 is a substantially L-shaped chassis arranged inside the stationary-side front case 110 and the stationary-side rear case 120. A screw through-hole 156 is created on a predetermined position on the chassis 155.

An antenna shaft 325 of the antenna 300a has a screw hole 326 in which a screw 160 is fixed. First, when the antenna 300a is inserted between the stationary-side front case 110 and the stationary-side rear case 120, the screw 160 is inserted through the screw through-hole 156 of the chassis 155.

Subsequently, the screw 160 is wound through the screw hole 326 on the antenna shaft 325 such that the antenna 300a is attached to the chassis 155.

As shown in FIG. 7, when the antenna shaft 325 of the antenna 300a is attached to the chassis 155, the bottom surface of the inserted tip of the antenna shaft 325 abuts against a connecting terminal 141, which is fixed to a circuit board 140. As a result, an electric connection is established between the antenna 300a and the circuit board 140.

However, in the case of the above-mentioned configuration, it is necessary to separately perform processing operations such as creating the screw hole 326 on the antenna shaft 325 such that the screw 160 can be wound therethrough or fabricating an abutting surface (flat surface) on the bottom surface of the antenna shaft 325 such that the connecting terminal 141, which is fixed to the circuit board 140, abuts against that abutting surface.

Moreover, use of the chassis 155 for attaching the antenna 300a to the cellular phone and for waterproofing the cellular phone leads to an increase in the number of components in the cellular phone. Furthermore, the amount of space required to arrange the chassis 155 gets in the way of downsizing the cellular phone.

Moreover, because the antenna 300a is attached to the cellular phone at an early stage of assembly of the cellular phone, there is a possibility that the antenna 300a gets damaged during the remaining assembly.

SUMMARY

It is an object of the present invention to at least partially solve the problems in the conventional technology.

According to an aspect of an embodiment, a mobile terminal device includes a stationary-side housing that includes a stationary-side front case to which an antenna is attached and a stationary-side rear case; a movable-side housing; and a coupling hinge unit that couples the movable-side housing to the stationary-side housing. The antenna includes an antenna body, an antenna shaft arranged at rear end of the antenna body, and an antenna attaching member arranged on the antenna shaft. The stationary-side front case has a shaft through-hole at a predetermined position through which the antenna shaft is insertable into the stationary-side front case. The mobile terminal device further includes a connection establishing unit arranged on a circuit board inside the stationary-side front case abuts against an inserted tip of the antenna shaft and establishes an electric connection therewith. The antenna body is fixedly attached to a predetermined position on the stationary-side front case by using the antenna attaching member.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

An exemplary embodiment of the present invention is described in detail below with reference to the accompanying drawings. In the exemplary embodiment, description is given for a cellular phone as a mobile terminal device. The present invention is not limited to the exemplary embodiment.

Figure 1:
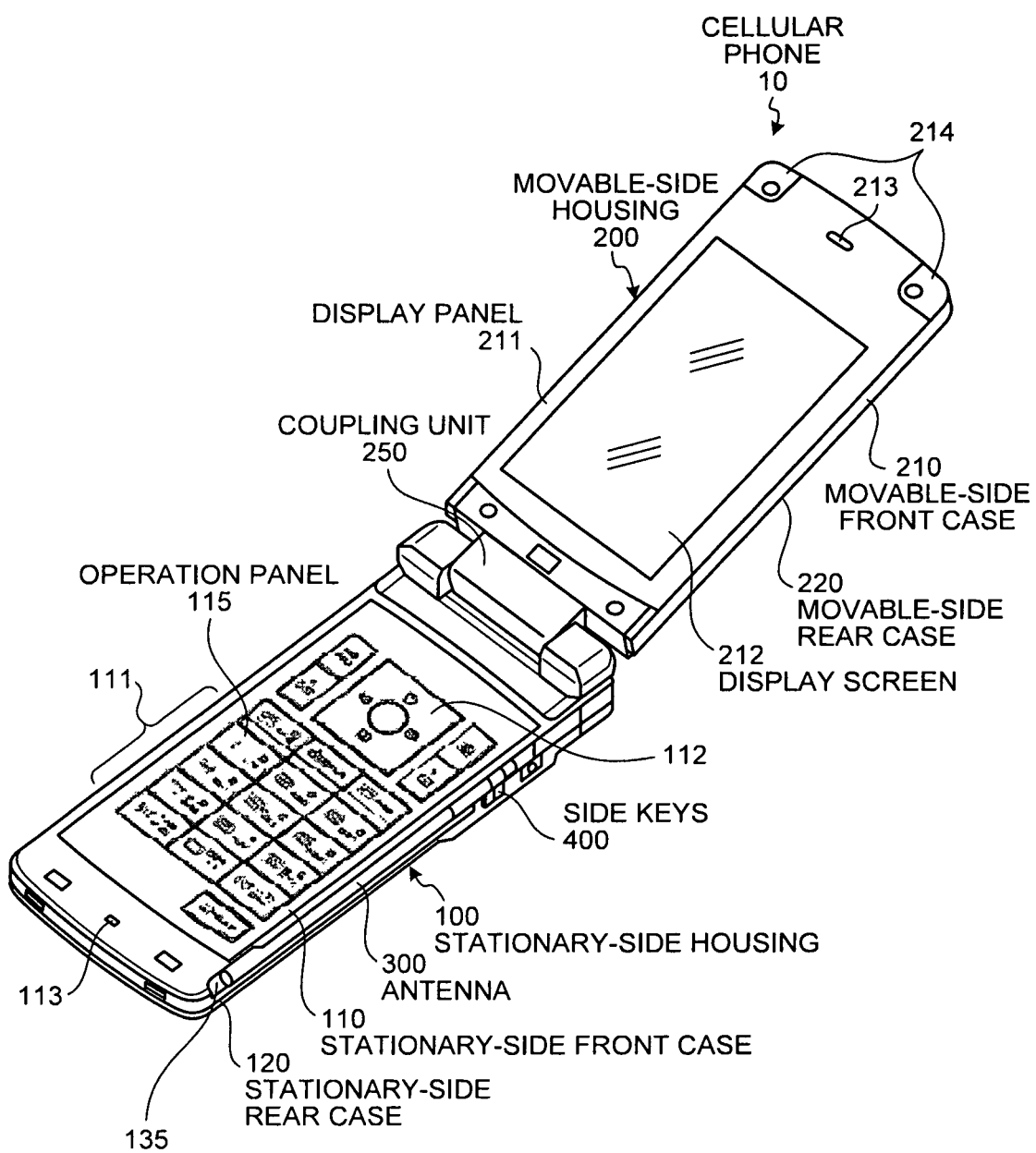
FIG. 1 is an external perspective view of a cellular phone in an open state according to a first embodiment.

Given below is the description of an exemplary configuration of a cellular phone 10 with reference to FIG. 1. FIG. 1 is an external perspective view of the cellular phone 10 in an open state according to a first embodiment of the present invention. The cellular phone 10 includes a palm-size stationary-side housing 100 and a movable-side housing 200. The stationary-side housing 100 and the movable-side housing 200 are coupled by a coupling unit 250.

More particularly, in the cellular phone 10 shown in FIG. 1, the stationary-side housing 100 is used to talk during a telephone call and has a plurality of operating keys such as a numerical keypad 111 with number keys from (0 to 9) and a function key 112 (mode setting key). The movable-side housing 200 is fabricated to have a substantially identical size to that of the stationary-side housing 100 and includes an LCD module (not shown). The coupling unit 250 couples the movable-side housing 200 to the stationary-side housing 100 in a foldable manner. The stationary-side housing 100 and the movable-side housing 200 are fabricated in a box shape from, although not limited to, a lightweight and high-strength magnesium alloy.

The stationary-side housing 100 is a two-fraction structure of a stationary-side front case 110 on the front side and a stationary-side rear case 120 on the rear side (the downside in FIG. 1). The stationary-side front case 110 includes an operation panel 115 in which the operation keys such as the numerical keypad 111 and the like are arranged.

More particularly, as shown in FIG. 1, the stationary-side front case 110 includes the numerical keypad 111, the function key 112, and a mouthpiece 113 having a microphone to convert voice of the user into electric signals. The stationary-side front case 110 and the stationary-side rear case 120 are clamped together at four positions by using spanning screws' (not shown).

An external foldable antenna 300 and a set of side keys 400 are arranged on a lateral side of the stationary-side front case 110. The detailed description of an antenna attaching mechanism for attaching the antenna 300 to the cellular phone 10 according to the first embodiment is described below in detail.

The movable-side housing 200 is a two-fraction structure of a movable-side front case 210 on the front side and a movable-side rear case 220 on the rear side (downside in FIG. 1). As shown in FIG. 1, a large-size display panel 211 and a large-size display screen 212 are arranged in the substantially central portion of the movable-side front case 210. The display panel 211 and the display screen 212 are used for viewing the display output by an LCD module (not shown).

An earpiece 213 is disposed in the top portion of the movable-side front case 210. The earpiece 213 catches the voice of the person on the other end of the line during a conversation. The movable-side front case 210 and the movable-side rear case 220 are clamped at four positions by using spanning screws (not shown). The spanning screws in the top portion of the display panel 211 are covered by screw covers 214.

Given below is the description with reference to FIGS. 2 to 6 of the antenna attaching mechanism for attaching the antenna 300 to the cellular phone 10 according to the first embodiment.

Figure 2:
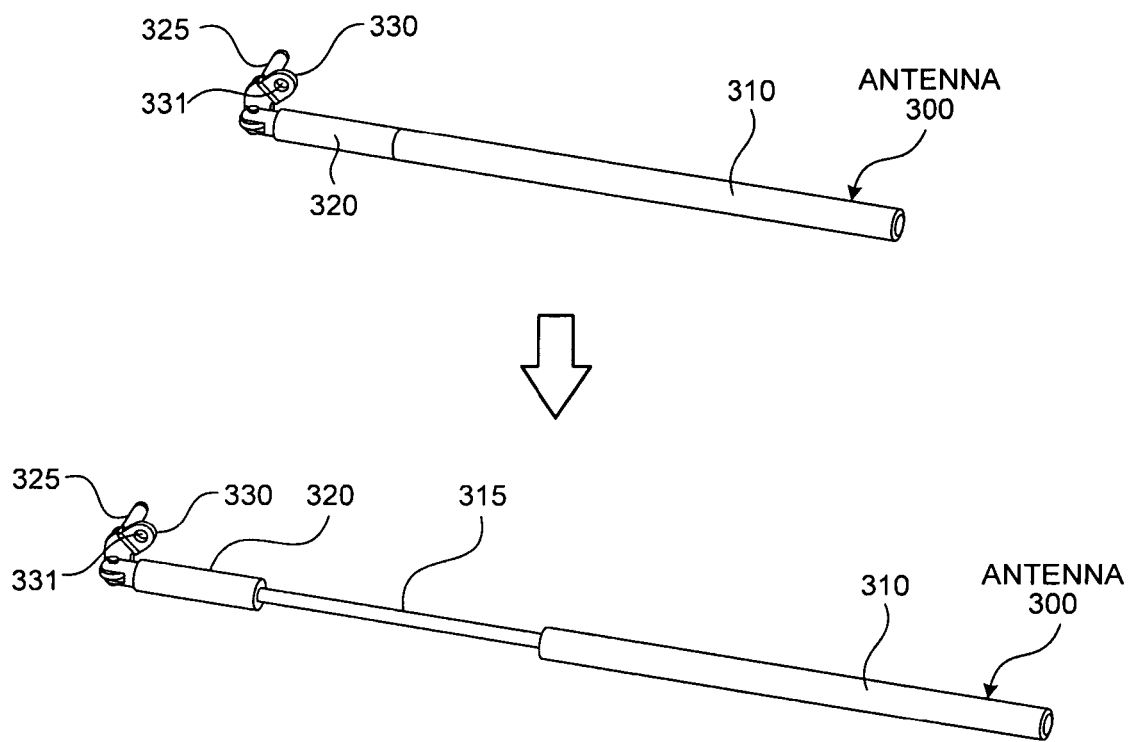
FIG. 2 is an external perspective view of an antenna shown in FIG. 1.
Figure 3:
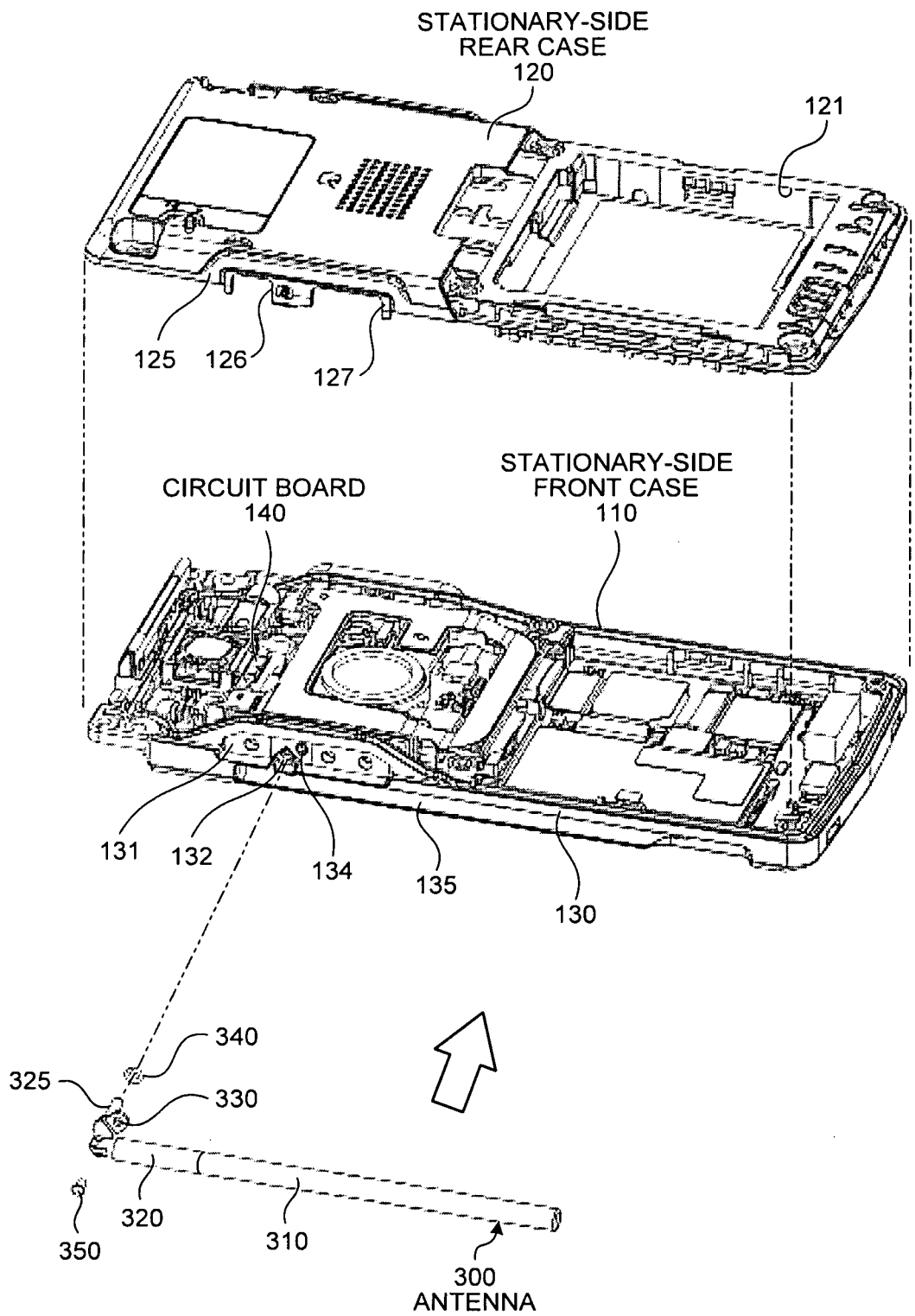
FIG. 3 is an exploded perspective view of a stationary-side housing shown in FIG. 1.
Figure 4:
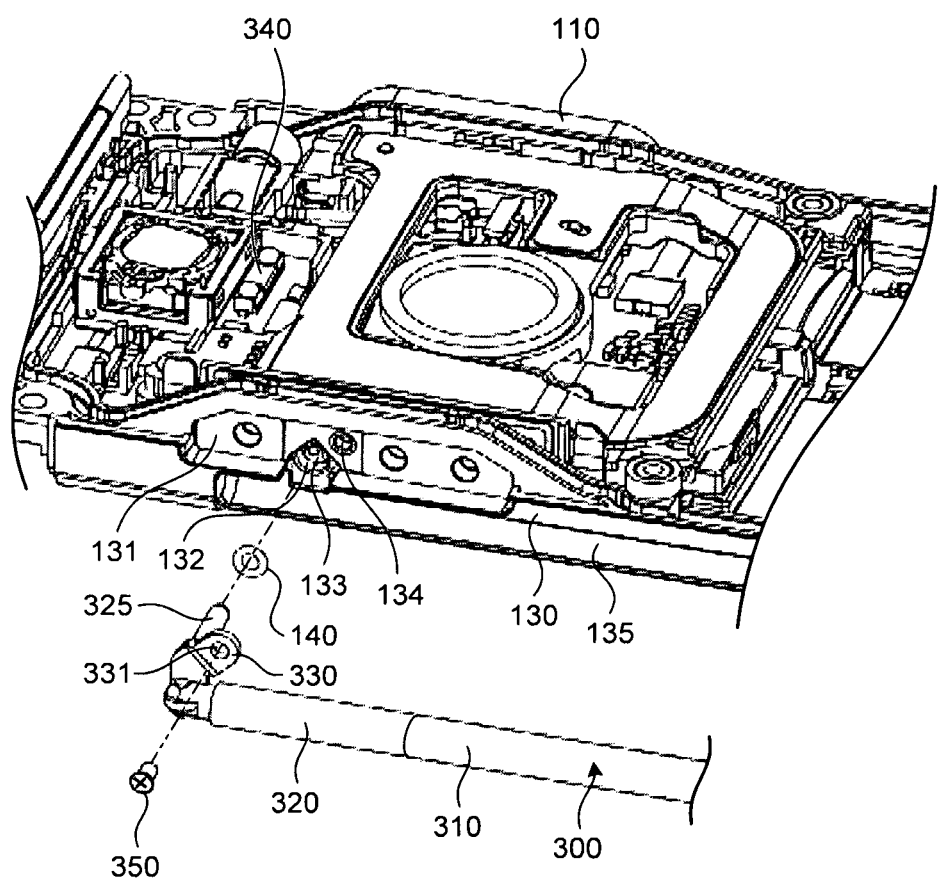
FIG. 4 is an enlarged perspective view for explaining essential parts around the position at which the antenna is attached.
Figure 5:
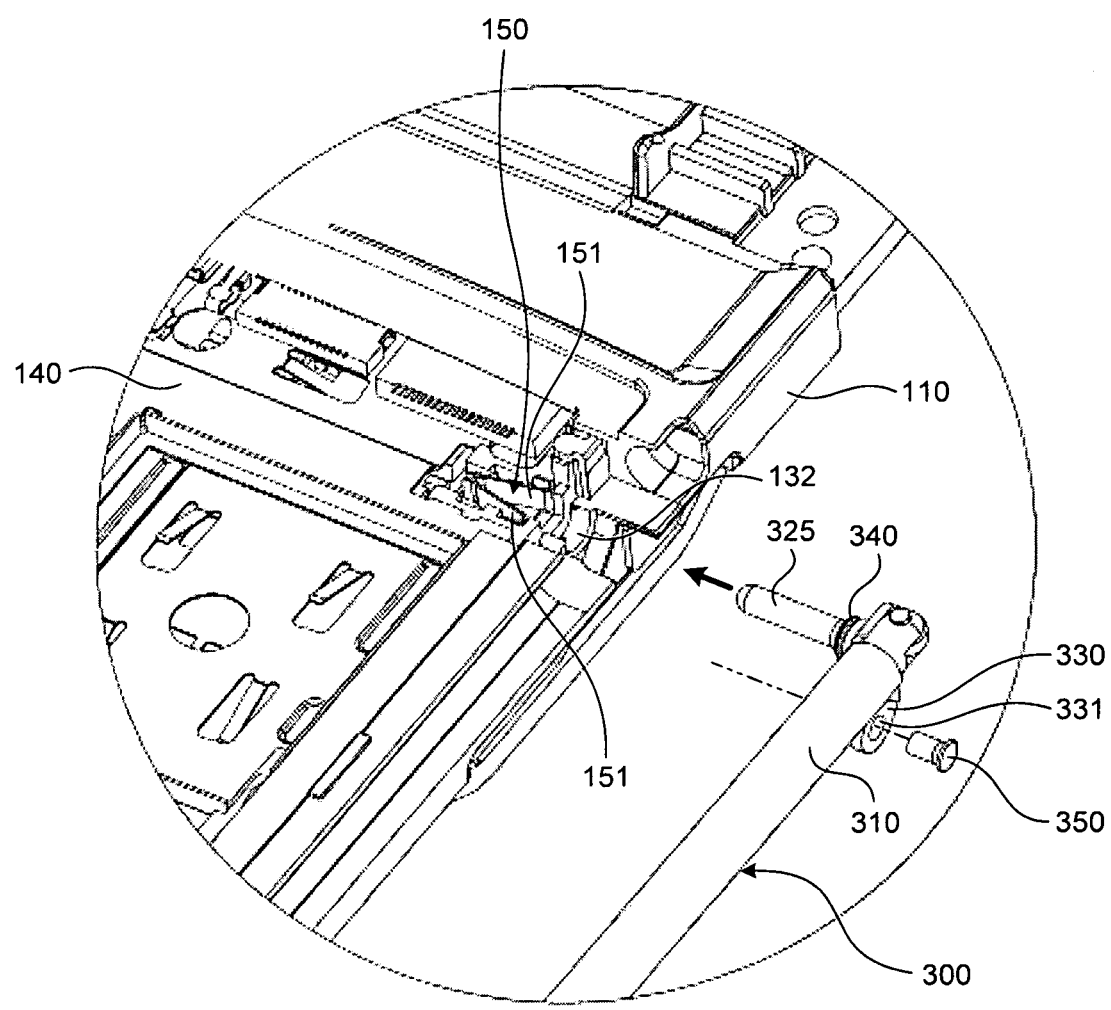
FIG. 5 is an enlarged perspective view for explaining essential parts before attaching the antenna.

FIG. 2 is an external perspective diagram of the antenna 300. FIG. 3 is an exploded perspective view of the stationary-side housing 100. FIG. 4 is an enlarged perspective view for explaining essential parts around the position at which the antenna is attached. FIG. 5 is an enlarged perspective view for explaining essential parts before attaching the antenna 300.

Figure 6:
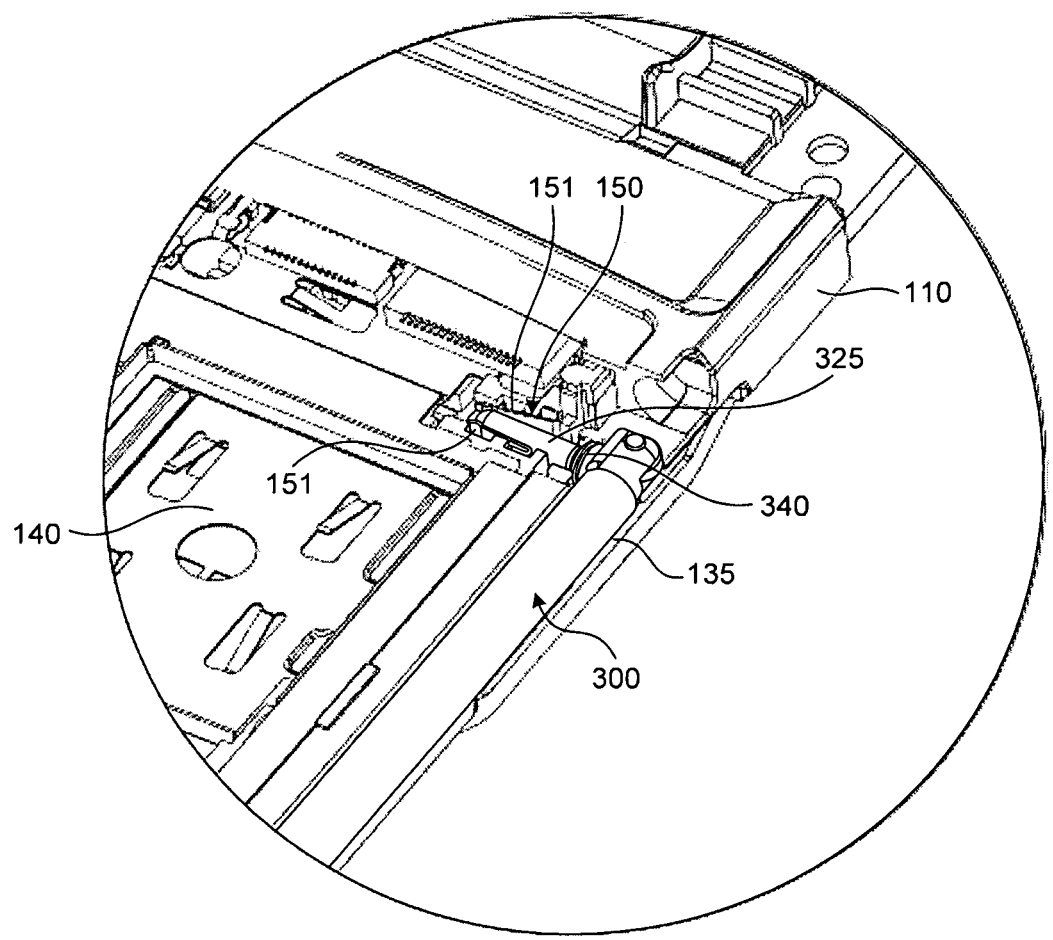
FIG. 6 is an enlarged perspective view for explaining essential parts after attaching the antenna.

FIG. 6 is an enlarged perspective view for explaining essential parts after attaching the antenna 300.

The antenna 300 to be attached externally to the cellular phone 10 according to the first embodiment includes an antenna body 310 and an antenna shaft 325 with a flange 330. The antenna shaft 325 is arranged at the rear end of the antenna body 310. The feature of the cellular phone 10 is that the stationary-side front case 110 includes a circuit board 140 to which a connection establishing unit 150 is fixed. When the antenna shaft 325 is inserted through a shaft through-hole 132, an electric connection is established between the antenna shaft 325 and the connection establishing unit 150. Moreover, the flange 330 on the antenna shaft 325 is used in attaching the antenna body 310 to the stationary-side front case 110.

In the cellular phone 10 according to the first embodiment, the shaft through-hole 132 is created on a lateral plate casing 130 of the stationary-side front case 110. To attach the antenna 300 to the cellular phone 10, the antenna shaft 325 is inserted through the shaft through-hole 132 and the flange 330 is screw-fixed to a screw hole 134, which is also created on the lateral plate casing 130, by using a screw 350. An O-ring 340 is disposed at the area of contact between the antenna 300 and the lateral plate casing 130 (i.e., around the shaft through-hole 132) to achieve waterproofing property.

After inserting the antenna shaft 325 of the antenna 300 through the shaft through-hole 132 formed on the lateral plate casing 130 of the stationary-side front case 110, the inserted tip of the antenna shaft 325 is linked to the connection establishing unit 150 fixed on the circuit board 140 of the stationary-side front case 110, which has a substantial V shape, such that an electric connection is established between the antenna 300 and the cellular phone 10.

As shown in FIGS. 2 and 3, the antenna 300 includes the antenna body 310, which is long cylindrical in shape, and a rear antenna portion 320. The antenna shaft 325 is arranged at the rear end of the rear antenna portion 320 at a substantially right angle with the rear antenna portion 320. That is, the antenna shaft 325 is configured to be bent at the rear end of the rear antenna portion 320 in a direction substantially perpendicular to the antenna body 310.

The flange 330 is arranged at the joint between the rear antenna portion 320 and the antenna shaft 325. The flange 330 has a screw through-hole 331 through which the screw 350 is inserted.

The antenna body 310 of the antenna 300 is housed in an antenna casing unit 135 formed at a predetermined position on the lateral plate casing 130. To increase the length of the antenna 300, the antenna body 310 can be elongated from the rear antenna portion 320 by extending an antenna central axis 315.

As described above, an electric connection is established between the antenna 300 and the connection establishing unit 150 when the antenna shaft 325 is inserted through the shaft through-hole 132 created on the stationary-side front case 110 and linked to the connection establishing unit 150 fixed on the circuit board 140.

The O-ring 340 fits on the rod-like antenna shaft 325 (see FIG. 3) such that the inside of the cellular phone 10 is maintained waterproof.

As shown in FIGS. 3 and 4, a lateral recess 131 is formed in the superior portion of the lateral plate casing 130 of the stationary-side front case 110 (left side in FIG. 3). The shaft through-hole 132 is created on the lateral plate casing 131. The antenna shaft 325 of the antenna 300 is inserted through the shaft through-hole 132. A ring fitting depression 133 is formed around the shaft through-hole 132 in which the O-ring 340 fits.

Similarly, a screw hole 134 is created on the lateral recess 131 of the lateral plate casing 130. The screw 350 is fixed in the screw hole 134 after it has passed through the screw through-hole 331 of the flange 330.

In this way, by screw-fixing the flange 330 on the antenna shaft 325 to the lateral recess 131 of the lateral plate casing 130 with the use of the screw 350, it is possible to fixedly attach the antenna 300 to the stationary-side front case 110.

As described above, the antenna body 310 and the rear antenna portion 320 of the antenna 300 are housed in the antenna casing unit 135, which is formed in an elongated shape on the lateral plate casing 130. Meanwhile, the stationary-side rear case 120 includes a rectangular battery casing unit 121 that is used to house a battery pack. Moreover, two notches 126 and 127 are created at predetermined positions in the superior portion (left side in FIG. 3) of a lateral plate casing 125 of the stationary-side rear case 120. When the stationary-side rear case 120 and the stationary-side front case 110 are assembled to form the stationary-side housing 100, the notches 126 and 127 surround the lateral recess 131 of the lateral plate casing 130.

Figure 7:
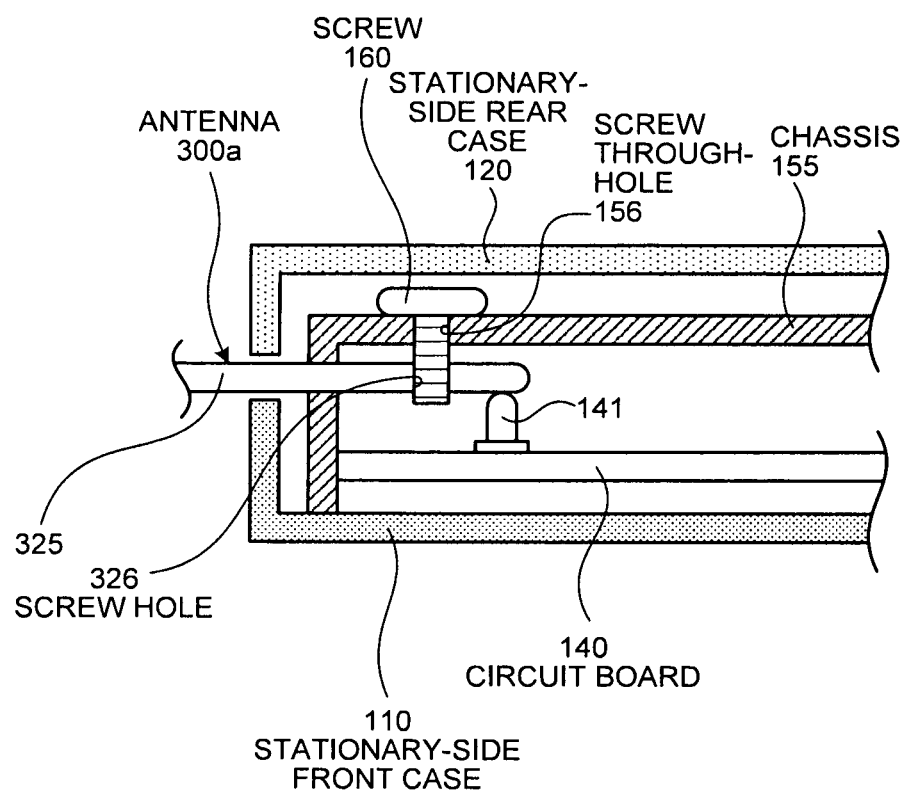
FIG. 7 is a diagram for explaining an external antenna attached to a cellular phone in a conventional manner.

Thus, because the antenna 300 is attached after assembling the external molded case (the stationary-side front case 110 and the stationary-side rear case 120), the antenna 300 remains housed in the antenna casing unit 135 and does not get damaged during the remaining assembly. Moreover, because there is no need to use the chassis 155 (see FIG. 7), which is a conventional antenna attaching member and a waterproofing member for attaching the antenna 300, the number of required components decreases thereby reducing the manufacturing cost. Moreover, by saving the space required to arrange the chassis 155, it becomes possible to downsize the cellular phone 10.

The circuit board 140 is arranged inside the stationary-side front case 110. An electric connection terminal (not shown) is disposed at a predetermined position on the circuit board 140. The connection establishing unit 150, which is used to establish an electric connection with the antenna shaft 325 of the antenna 300, is attached to the electric connection terminal.

As shown in FIG. 5, the connection establishing unit 150 is open toward the shaft through-hole 132 on the lateral plate casing 130 of the stationary-size front case 110 and is fabricated by arranging a pair of connection plates 151 in a substantial V shape.

More particularly, the reason for fabricating the connection establishing unit 150 open toward outside (in a substantial V shape) is to enable insertion of the antenna 300 through the shaft through-hole 132 (see FIG. 4) from the outside of the molded case (i.e., the stationary-side front case 110).

In the first embodiment, the connection establishing unit 150 fabricated from the pair of connection plates 151 is made of, although not limited to, beryllium copper alloy that has low frequency of magnetization, predetermined strength, and high electric conductivity.

To sandwich the antenna shaft 325, the pair of connection plates 151 has a predetermined spring pressure. When the tip of the antenna shaft 325 of the antenna 300 is inserted in the connection establishing unit 150, the antenna shaft 325 robustly fits in the connection establishing unit 150 because of the spring pressure of the pair of connection plates 151 thereby resulting in excellent electric conductivity.

Moreover, because the antenna shaft 325 of the antenna 300 abuts against the pair of connection plates 151 over a wide area, the problem of loose connection between the antenna shaft 325 and the connection establishing unit 150 does not occur even if the antenna 300 is twisted or turned.

Given below is the description of a sequence of attaching the antenna 300 to the cellular phone 10 with reference to FIGS. 5 and 6.

(1) First, the antenna shaft 325 of the antenna 300 is inserted through the shaft through-hole 132 created on the lateral plate casing 130 (the lateral recess 131) of the stationary-side front case 110.

(2) At that time, the O-ring 340 on the antenna shaft 325 fits in the ring fitting depression 133 formed around the shaft through-hole 132 (see FIG. 4). That is, by disposing the O-ring 340 at the joint between the antenna shaft 325 of the antenna 300 and the shaft through-hole 132 (i.e., the ring fitting depression 133), it becomes possible to make the stationary-side front case 110 and the stationary-side rear case 120 waterproof.

(3) The inserted tip of the antenna shaft 325 then gets linked to the connection establishing unit 150, which is fixed to the circuit board 140.

(4) Subsequently, the screw 350 is inserted through the screw through-hole 331 created on the flange 330 on the antenna shaft 325 and is fixed in the screw hole 134 created on the lateral plate casing 130 (the lateral recess 131).

To sum up, in the cellular phone 10 according to the first embodiment, the antenna shaft 325 of the antenna 300 is first inserted through the shaft through-hole 132 created on the lateral plate casing 130 of the stationary-side front case 110 and then the flange 330 on the antenna shaft 325 is screw-fixed in the screw hole 134 created at a predetermined position on the lateral plate casing 130 of the stationary-side front case 110. That eliminates the need to use an antenna attaching member (e.g., a chassis) to attach the antenna 300 to the stationary-side front case 110. As a result, the number of required components decreases and the antenna 300 can be housed in a smaller space. Such a configuration enables manufacturing of small and slim cellular phones.

When the antenna shaft 325 of the antenna 300 is inserted through the shaft through-hole 132 created on the lateral plate casing 130 of the stationary-side front case 110, the inserted tip of the antenna shaft 325 abuts against the substantially V-shaped connection establishing unit 150 fixed on the circuit board 140. As a result, an electric connection can be robustly established between the antenna 300 and the circuit board 140.

As described above, after attaching the antenna 300 to the cellular phone 10, it is housed in the antenna casing unit 135 in a folded manner (see FIG. 3). Subsequently, the stationary-side rear case 120 and the stationary-side front case 110 are assembled. As a result, unlike in a conventional assembly, it becomes possible to reliably prevent the antenna 300 from getting damaged during the assembly.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

Meanwhile, although the first embodiment is given for a folding cellular phone in which a hinge structure is used for coupling a movable-side housing to a stationary-side housing, it is also possible to use a hinge structure other than that shown in the drawings. Moreover, instead of a folding cellular phone, the above description can also be implemented for a cellular phone in which the movable-side housing is overlappably coupled to the stationary-side housing with the use of a coupling unit having a sliding structure or a rotating structure.

The mobile terminal device in the first embodiment is assumed to be a cellular phone. However, the above description can also be implemented as an antenna attaching configuration for a small-size information processing device such as a personal digital assistant (PDA), or a small-size music player, or a portable television, or a handheld gaming device.

In this way, according to the embodiments, an antenna is attached to a cellular phone as the last step of assembly thereby making the assembly process more efficient and preventing the antenna from getting damaged during the assembly. Moreover, because there is no need to use an additional antenna attaching member (e.g., a chassis) to attach the antenna to a stationary-side front case of the cellular phone, it becomes possible to reduce the number of required components and downsize the cellular phone.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A mobile terminal device comprising:
   a stationary-side housing that includes a stationary-side front case to which an antenna is attached and a stationary-side rear case;
   a movable-side housing; and
   a coupling hinge unit that couples the movable-side housing to the stationary-side housing, wherein
   the antenna includes an antenna body, an antenna shaft arranged at rear end of the antenna body, and an antenna attaching member arranged on the antenna shaft,
   the stationary-side front case has a shaft through-hole at a predetermined position through which the antenna shaft is insertable into the stationary-side front case,
   a connection establishing unit arranged on a circuit board inside the stationary-side front case abuts against an inserted tip of the antenna shaft and establishes an electric connection therewith, and
   the antenna body is fixedly attached to a predetermined position on the stationary-side front case by using the antenna attaching member, and
   wherein the antenna attaching member arranged on the antenna shaft has a screw through-hole through which a screw is insertable,
   the stationary-side front case has a screw hole at the predetermined position on the stationary-side front case in which a threaded portion of the screw is fixable, and
   a direction in which the antenna is inserted through the through-hole created on the stationary-side front case going in the same direction in which the screw is inserted through the screw through-hole created on the stationary-side front case, via a through-hole created on a flange, and
   wherein the connection establishing unit includes a pair of connection plates that open toward the shaft through-hole and form a substantial V shape while the antenna shaft abuts the pair of connection plates,
   the pair of connection plates close before the antenna shaft fits into the connection establishing unit, and
   the flange is arranged at a joint between the rear end of the antenna body and the antenna shaft and has a screw through-hole through which a screw is inserted.

2. The mobile terminal device according to claim 1, further comprising:
   a waterproofing O-ring disposed on the antenna shaft arranged at the rear end of the antenna body; and
   a ring fitting depression arranged so as to circumscribe the shaft through-hole in which the O-ring is fittable.

3. The mobile terminal device according to claim 1, wherein the antenna shaft at the rear end of the antenna body is arranged at a substantially right angle with the antenna body.

4. The mobile terminal device according to claim 1, wherein the connection establishing unit is made of beryllium copper alloy.

* * * * *